United States Patent [19]

Baxter et al.

[11] Patent Number: 4,535,448
[45] Date of Patent: Aug. 13, 1985

[54] DUAL BUS COMMUNICATION SYSTEM

[75] Inventors: Leslie A. Baxter, Eatontown; Sanford S. Brown, River Plaza, both of N.J.

[73] Assignee: AT&T Bell Laboratories, Murray Hill, N.J.

[21] Appl. No.: 448,771

[22] Filed: Dec. 10, 1982

[51] Int. Cl.³ .............................................. H04J 3/02
[52] U.S. Cl. ......................................... 370/85; 370/94
[58] Field of Search ................. 370/94, 85, 92, 60, 370/80

[56] References Cited

U.S. PATENT DOCUMENTS

| | | | |
|---|---|---|---|
| 4,216,544 | 8/1980 | Boleda et al. | 375/119 |
| 4,224,688 | 9/1980 | Ciancibello et al. | 370/62 |
| 4,251,880 | 2/1981 | Baugh et al. | 370/80 |
| 4,254,496 | 3/1981 | Munter | 370/16 |
| 4,300,194 | 11/1981 | Bradley et al. | 364/200 |
| 4,306,304 | 12/1981 | Baxter et al. | 370/108 |

Primary Examiner—Douglas W. Olms
Attorney, Agent, or Firm—David H. Tannenbaum

[57] ABSTRACT

A dual set of busses is used to provide close coupling between the data and voice services of the CS300 communication system. One of these busses is a time division multiplex bus arranged for communication between port access circuits, and the other bus is a packet-switched data processing bus used for interfacing both with the system peripherals and with the port access circuits. The port access circuits, as well as the faster peripheral circuits, can be connected to either or both busses thereby allowing for the efficient easy interchange of information.

8 Claims, 7 Drawing Figures

DUAL BUS COMMUNICATION SYSTEM

BACKGROUND OF THE INVENTION

This invention relates to a communication processing system having a multiple bus input structure for the transmission of differing data types.

In communication systems the station, or port, access circuits typically receive information which must be processed by a system resource. In some situations this data must be transferred to a high speed peripheral, such as a disk, and in some cases the information must be transferred to another port access circuit. For voice data, an efficient transfer medium is a time division bus where time slots are assigned for the duration of a call. For bursty, or high speed, data an efficient transfer medium is a packet-switched bus. Thus, an attempt to interface the access circuits with one or the other of the bus types results in a compromise of efficiency with a resultant reduction in system capability.

One solution to this problem would be to use a voice interface circuit between voice stations with a time division bus and to use a data interface circuit between data terminals with a packet-switched bus. Such an arrangement solves the basic problem but introduces other undesirable limitations. For example, the typical arrangement for using line circuits is to have the circuits plug into the back plane wiring of a board carrier or housing. Thus, following the above example, it would be necessary to dedicate specific board locations on the carrier to each type of bus and to only use the proper line card for interfacing each bus. This arrangement requires separate inventories of line cards and specific knowledge of which physical spaces each type of line card is adapted to use.

In such an arrangement another concern is the pre-engineering that would be required so that there will be enough available physical locations for each board type. Accordingly, systems which are designed primarily for voice would have more available time division positions than packet-switched positions. In such situations if the system migrates toward data terminals it may become necessary to restructure the physical layout to accommodate the necessary interface circuits. This restructuring is costly and inefficient. Accordingly, a need exists for a bus structure which will easily accommodate the various transmission requirements at all positions.

SUMMARY OF THE INVENTION

These problems have been addressed in a communication system where each interface circuit has access to both a time division bus and to a packet-switched bus simply by plugging the circuit into any connector. Using this arrangement bus entry points are available for each bus on all connectors so that simply by plugging the board into the connector both time division and packet switching access is available.

In this manner it is possible for an access circuit, for example, to communicate with another access circuit during a time slot for the exchange of voice data and to communicate with a peripheral device (a voice storage disk) over the packet bus either concurrently or between time slots.

This structure, in addition to solving the physical layout problem, also allows the system to operate in a manner not previously contemplated. For example, in some situations it is necessary to have a protocol interchange between communicating stations. This would be possible by using a shared common protocol conversion circuit and allowing any interface circuit to communicate with the common conversion circuit at any time over the packet-switched bus. Thus, signals incoming from the station would pass through the interface circuit and via the packet-switched bus to the common conversion circuit. The converted signals would then be returned to the interface circuit and would then pass to the other station over the time division bus in the assigned time slot. Such an arrangement would work also for many such features where a common circuit may serve a number of interface circuits concurrently.

Another advantage of such an arrangement is that circuit boards which do not require access to a certain bus need not be equipped for such access, thereby reducing the cost of those boards, as opposed, for example, to U.S. Pat. No. 4,251,880 dated Feb. 17, 1981, which requires all circuit boards to have concurrent access to both busses.

BRIEF DESCRIPTION OF THE DRAWINGS

The invention and its several other objects, features and advantages will be more fully understood from a reading of the following description to one embodiment taken in conjunction with the drawing in which.

DETAILED DESCRIPTION

Figure 1:
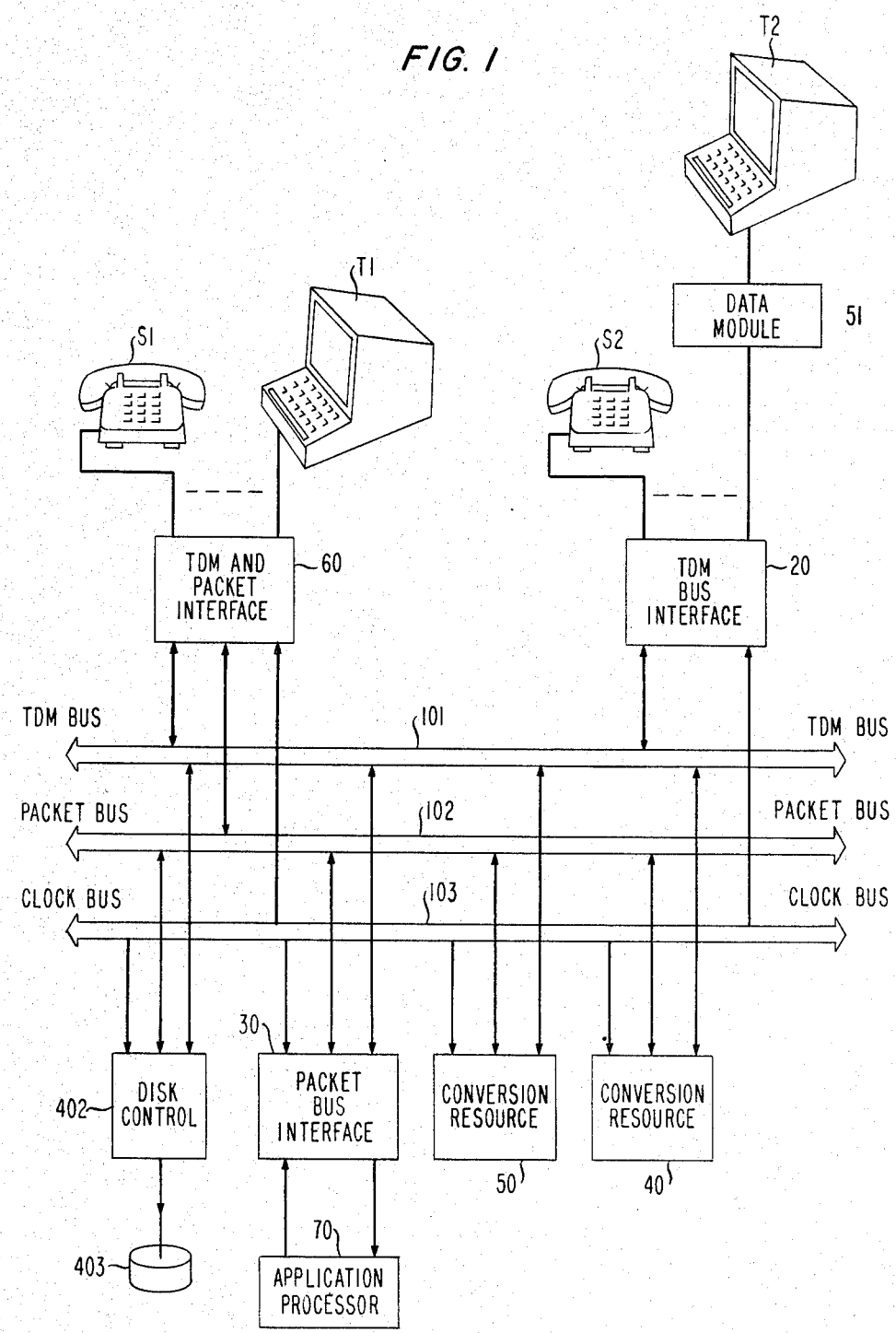
FIG. 1 shows an overall system block diagram of a parallel running dual bus structure.

FIG. 1 illustrates a communication system having both a time division (TDM) bus 101 and a packet bus 102, as well as clock bus 103. TDM bus 101 contains both circuit-switched time slots and the control channel (for call set-up, etc.). Some of the circuit packs (e.g., TDM bus interface 20) access only the TDM bus. Others (e.g., packet bus interface 30) use the packet bus for communication and use the TDM bus for control information. Still other circuit packs (e.g., TDM and packet interface 60) use both the TDM and packet busses for communication purposes. The structure of each of these busses could be, for example, a set of coaxial tables, with one cable for each path of the bus. Each cable path would then have a termination on the same pin position of each plug-in connection of all the board carriers. Thus, any board type may be plugged into any board position and may have access to either bus.

TDM Bus Interface

Figure 2:
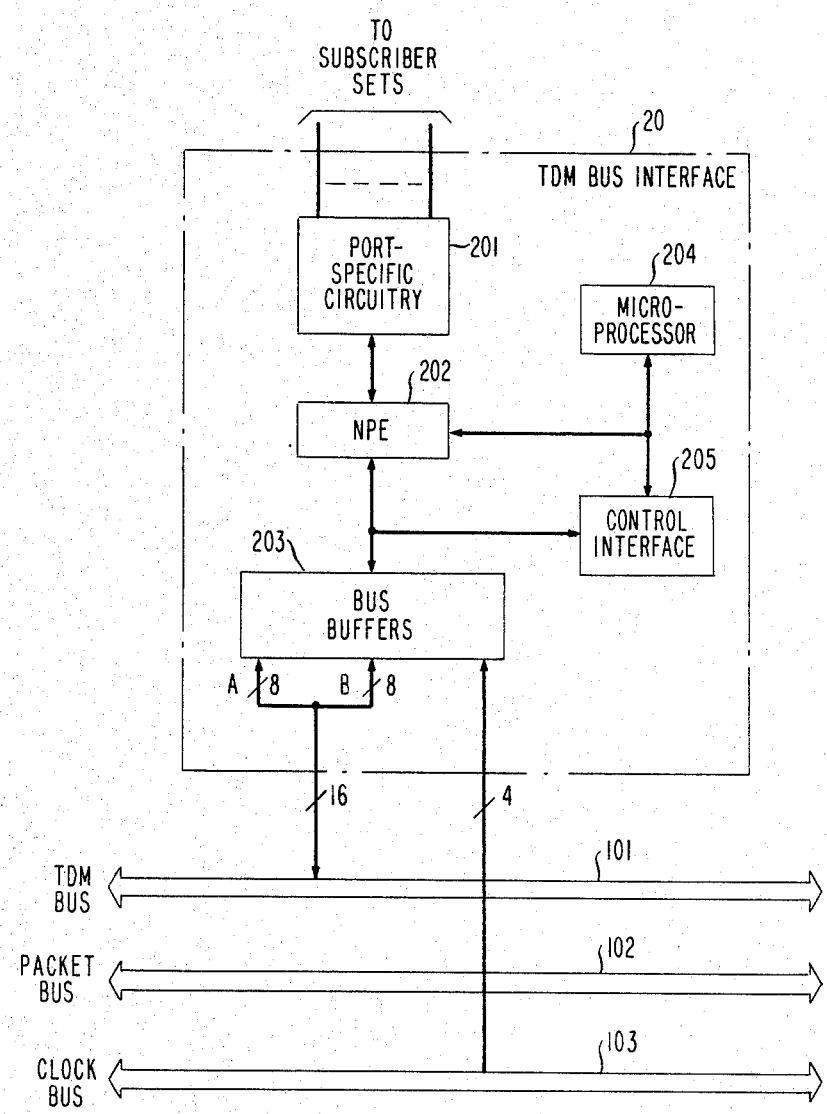
FIG. 2 shows details of the TDM bus interface.

FIG. 2 gives more detail for TDM bus interface 20. This interface is similar to the one described in copending patent application L. A. Baxter et al. Ser. No. 256,937, filed Apr. 23, 1981 now U.S. Pat. No. 4,389,720, issued June 21, 1983. Bus buffer 203 and the bus structures are described in copending concurrently filed patent application D. B. James et al., Ser. No. 448,835, filed Dec. 10, 1982. Network Processing Element 202 provides the time slot interchange functions, as well as gain control and conferencing. They are described in the aforementioned Baxter et al. application and in Moffitt-Ross, Ser. No. 256,970, filed Apr. 23, 1981 now U.S. Pat. No. 4,382,295, issued May 3, 1983. These two applications, as well as the Moffitt-Smith application, are hereby incorporated by reference herein. Port-specific circuit 201 contains the standard circuitry necessary to support various types of telephones or communication devices.

PACKET BUS INTERFACE

Figure 3:
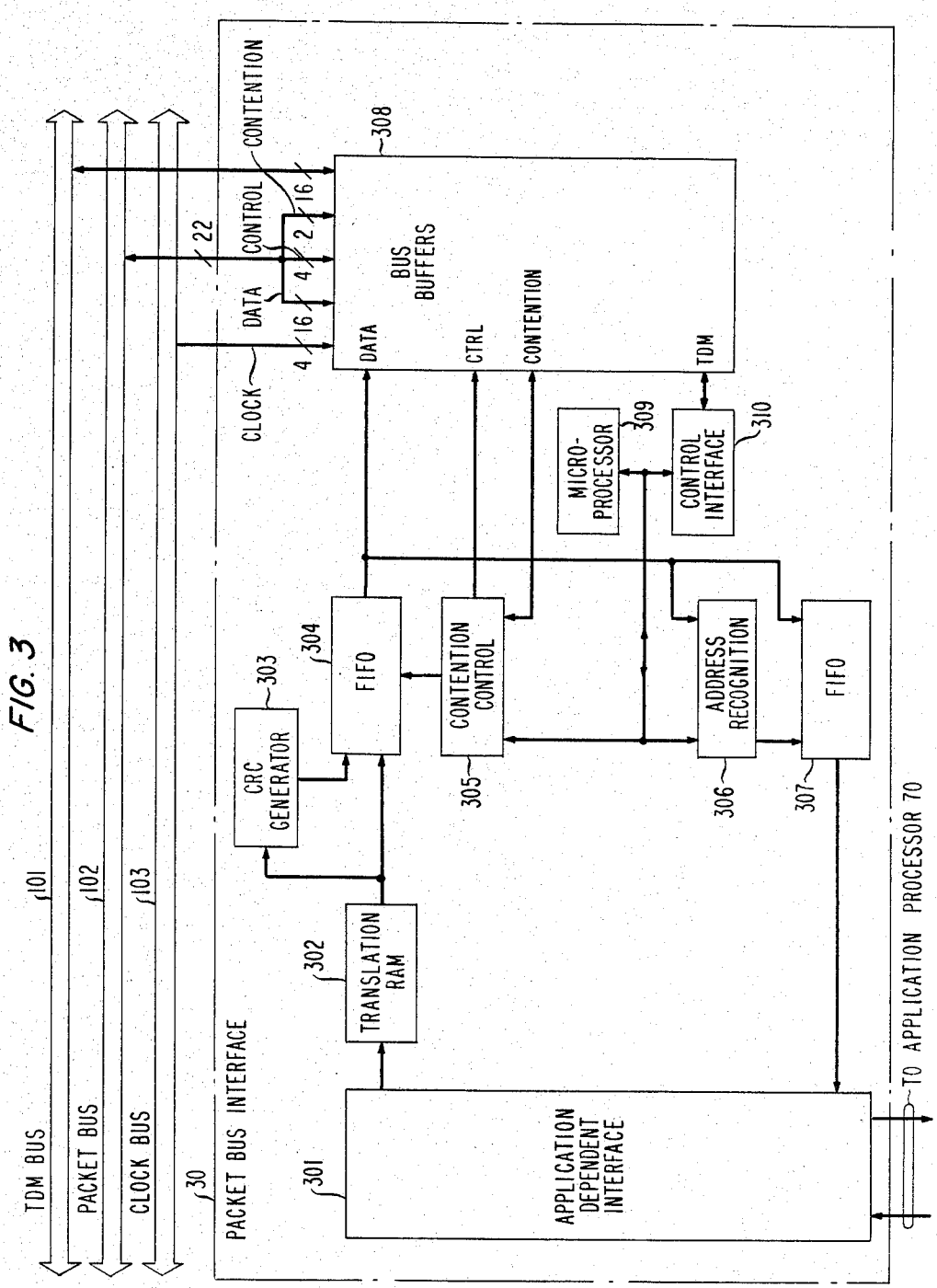
FIG. 3 shows details of the packet bus interface.

FIG. 3 shows a more detailed view of packet bus interface 30. This circuit accesses TDM bus 101 only for control information with all data communication being accomplished via packet bus 102. Control interface 310 and microprocessor 309 process the control information exactly the same as on TDM bus interface 20.

The packet bus consists of a parallel data path, a contention bus, and control leads. Any of the standard contention protocols, such as A. S. Tanenbaum, *Computer Networks*, Prentice-Hall, 1981, Chapt. 7, and W. R. Franta and I. Chlamtac, *Local Networks*, Lexington Books, 1981, Chapt. 3, can be used on this bus. The particular implementation could be a variation of a packet-switch bus known as Datakit, as discussed in A. G. Fraser, "Datakit—A Modular Network for Synchronous and Asynchronous Traffic," *Proc. ICC*, 1979, June 1979, Boston, Mass., pp. 20.1.1–20.1.3. In the transmit direction, the circuit operates as follows. Translation RAM 302 takes data packets from application dependent interface 301 and inserts the proper destination address. CRC generator 303 appends an error-checking checksum to the end of the packet, which is then stored in FIFO 304. When contention control circuit 305 indicates that it has gained control of the data bus, FIFO 304 proceeds to transmit the packet. In one implementation two 9-bit envelopes are transmitted in parallel until the packet is completely transmitted.

In the receive direction, address recognition circuit 306 monitors all packets on the data bus. When circuit 306 detects its own address, a signal is provided to signals FIFO 307 to store the incoming packet, which is then delivered to application interface 301.

In this example, application interface 301 would be a DMA interface to processor 70. In other cases, application interface 301 may interface to a fiber-optic data link, a terminal multiplexor, or to any number of other devices.

As shown in FIG. 1, TDM and packet interface 60 allows, for example, telephone S1 to use circuit-switched TDM bus 101 for continuously generated voice samples while terminal T1 uses packet bus 102 for bursty data transmissions.

Figure 6:
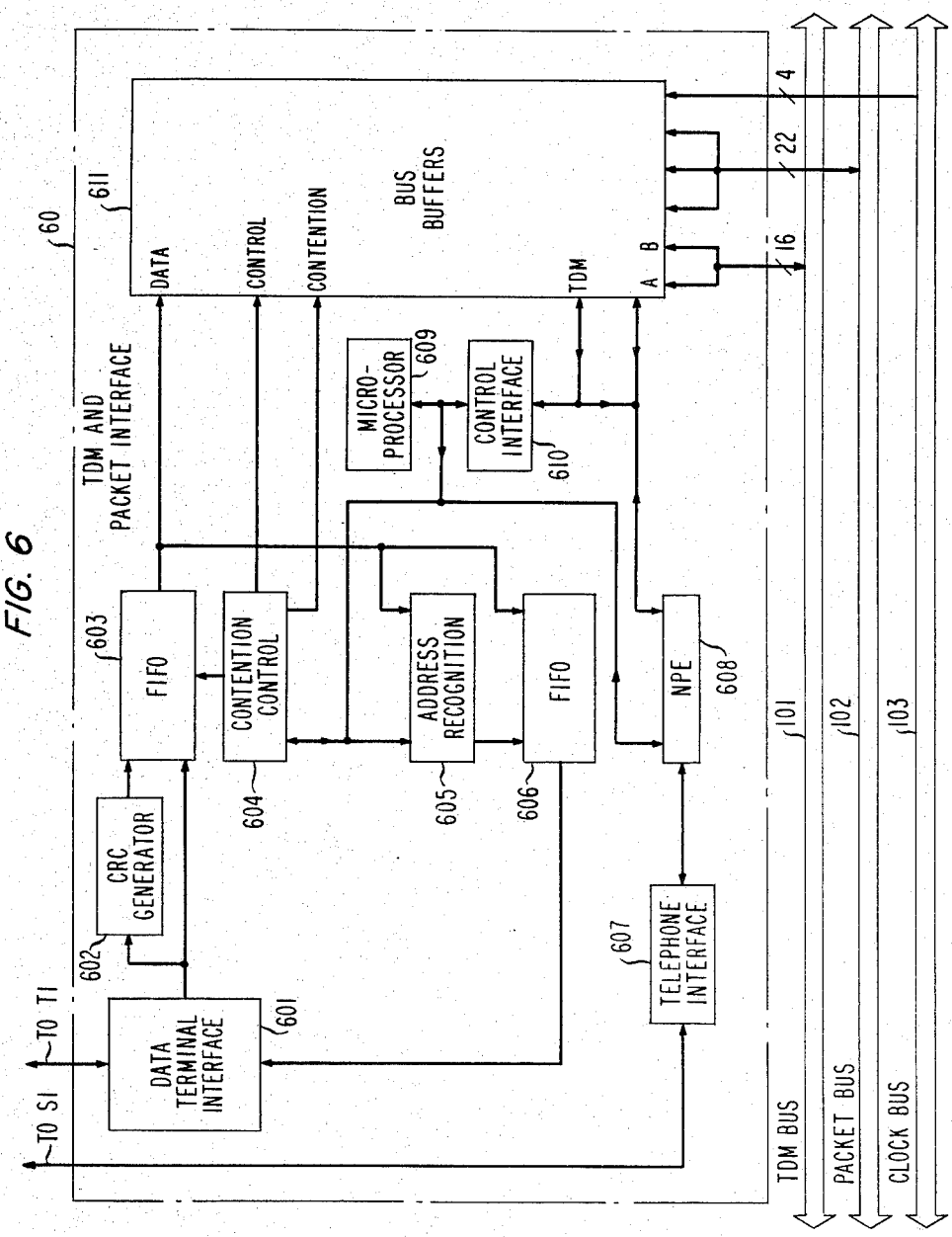
FIG. 6 shows details of a dual interface for both continuous and bursty data.

FIG. 6 shows a more detailed view of combined TDM and packet interface 60.

The circuit is similar to a combination of TDM bus interface 20 and packet bus interface 30, except that only one set of bus buffers 611, and only one control complex, consisting of microprocessor 609 and control interface 610, are required for connections on both the TDM and packet busses.

The TDM portion of the interface is similar to the TDM bus interface 20. It contains NPE 608 to control the actual circuit switching. Telephone interface 607 is a particular implementation of the port-specific circuitry 201.

The packet interface portion of the circuit is almost identical to packet bus interface 30, except that application interface 301 has been replaced by data terminal interface 601. Data terminal interface 601 does the packet assembly/disassembly (PAD) functions required for accessing a packet-switched system.

CONVERSION RESOURCES

Numerous examples of conversion resources can be envisioned. Two examples are shown in FIGS. 4 and 5 to illustrate the advantages of simultaneous access to both the TDM and packet busses.

Figure 4:
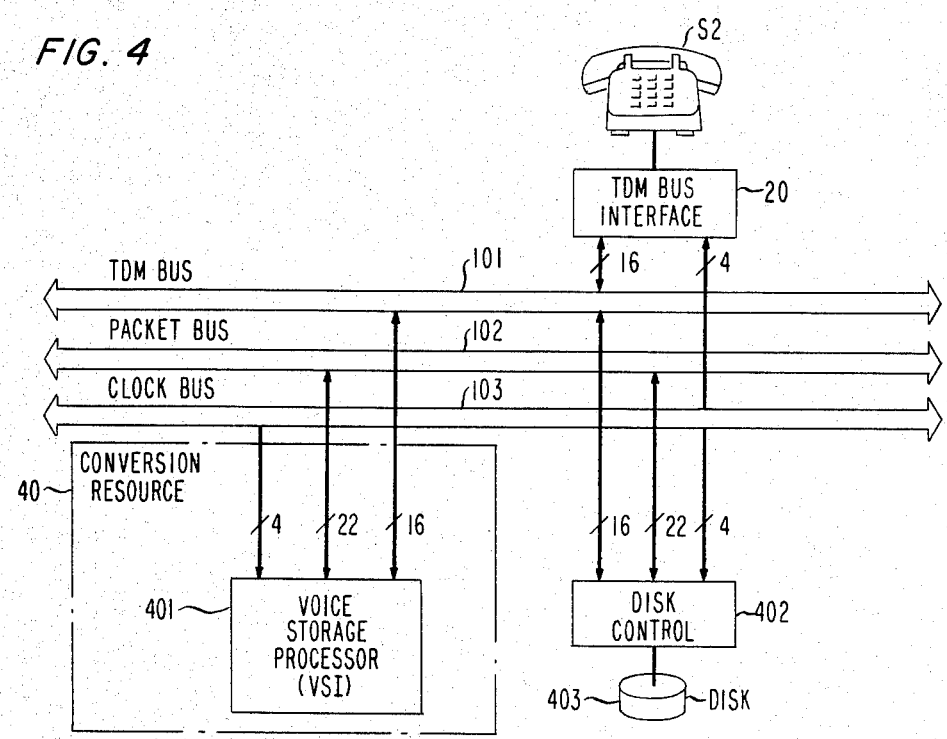
FIGS. 4 and 5 show examples of shared resource usage over the two system busses.
Figure 5:
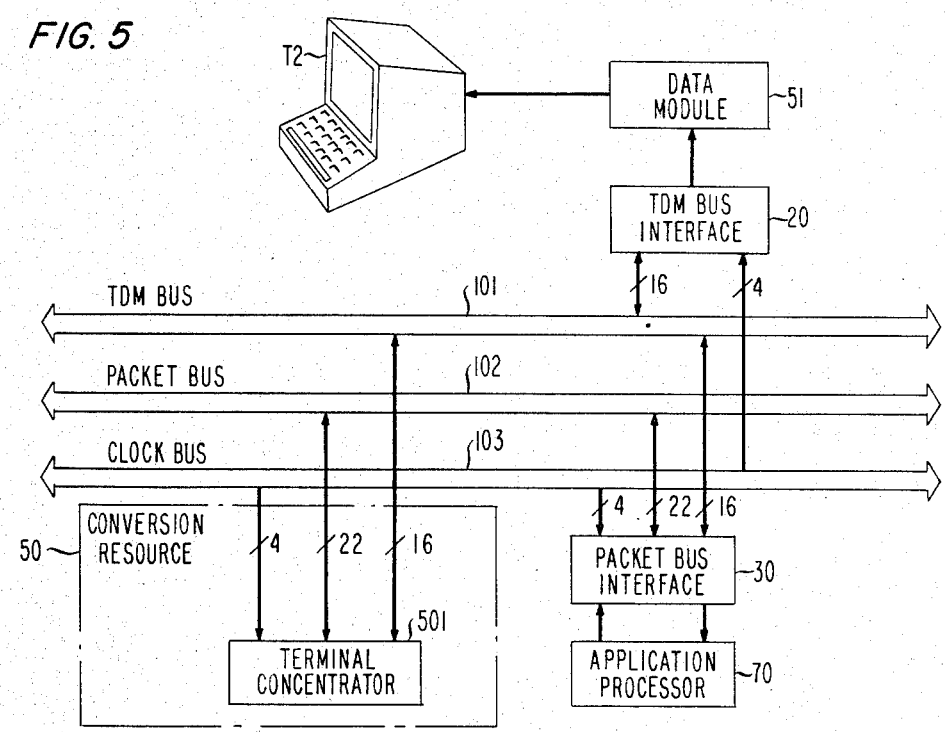

In FIG. 4 conversion resource 40 consists of voice storage processor (VSP) 401. Telephone S2, in conjunction with TDM bus interface 20, generates a continuous 64 Kb/s PCM bit stream which is transmitted in a particular assigned circuit-switched time slot on TDM bus 101. VSP 401 receives this PCM bit stream from bus 101 and encodes it using a more efficient algorithm, such as Linear Prediction Coding or Sub-band Coding (as discussed in L. R. Rabiner and R. W. Schafer, *Digital Processor of Speech Signals,* Prentice-Hall, 1978) to reduce the bit rate. This encoded speech can be temporarily stored or assembled and then packets of compressed speech can be sent over packet bus 102 to disk control 402 for storage in disk 403.

To play back a recorded message, VSI 401 sends a message over packet bus 102 to disk control 402 to fetch encoded speech packets over the packet bus from disk 403. VSI 401 converts the encoded speech packets back to PCM and places them on TDM bus 101 in a time slot assigned to TDM bus interface 20 which then receives the PCM signal and presents it to telephone S2.

It would appear that disk control 402 could communicate directly with TDM bus interface 20 directly over the TDM bus. However, this is not practical since it is desired, i.e., for economical storage purposes, etc., to connect the PCM signals to a more compact form. Using the system shown, a common conversion resource can be shared among many stations. Also, it would appear that the transfer of information between conversion resource 40 and disk control 402 could occur over the TDM bus. There are several reasons why this, while possible, is not practical. One such reason is because the encoded speech packets, due to the elimination of silent intervals, are not generated at a constant rate. Thus, it would be wasteful of bandwidth to circuit switch these packets over the TDM bus. Another reason is that the transfer between resource 40 and disk control 402 can be delayed for variable time intervals again using up needed bandwidth if a time slot had to remain dedicated to such bursty data transfer.

Also, other devices, such as application processor 70 (FIG. 1), can access disk 402 via the pocket bus for high-speed file transfers while the voice storage operation is proceeding.

A second example of a conversion resource is the terminal concentrator 501, illustrated in FIG. 5. Terminal concentrator 501 receives circuit-switch data over the TDM bus from a number of terminals (e.g., terminal T2, terminal S1). Terminal concentrator 501 performs PAD functions on the circuit-switched data and sends the data packets over the packet bus to packet bus interface 30 which transmits the information to application processor 70. Terminal concentrator 501 is thus providing a multiplexed front-end function for application processor 70. This provides for greater throughput from application processor 70 as well as eliminating the need for a data module, such as data module 51, at the application processor end of each connection if communication were to be over the TDM bus. Also, if communication to and from processor 70 were to be over the TDM bus, then one or more time slots would have to be permanently assigned to the processor.

Figure 7:
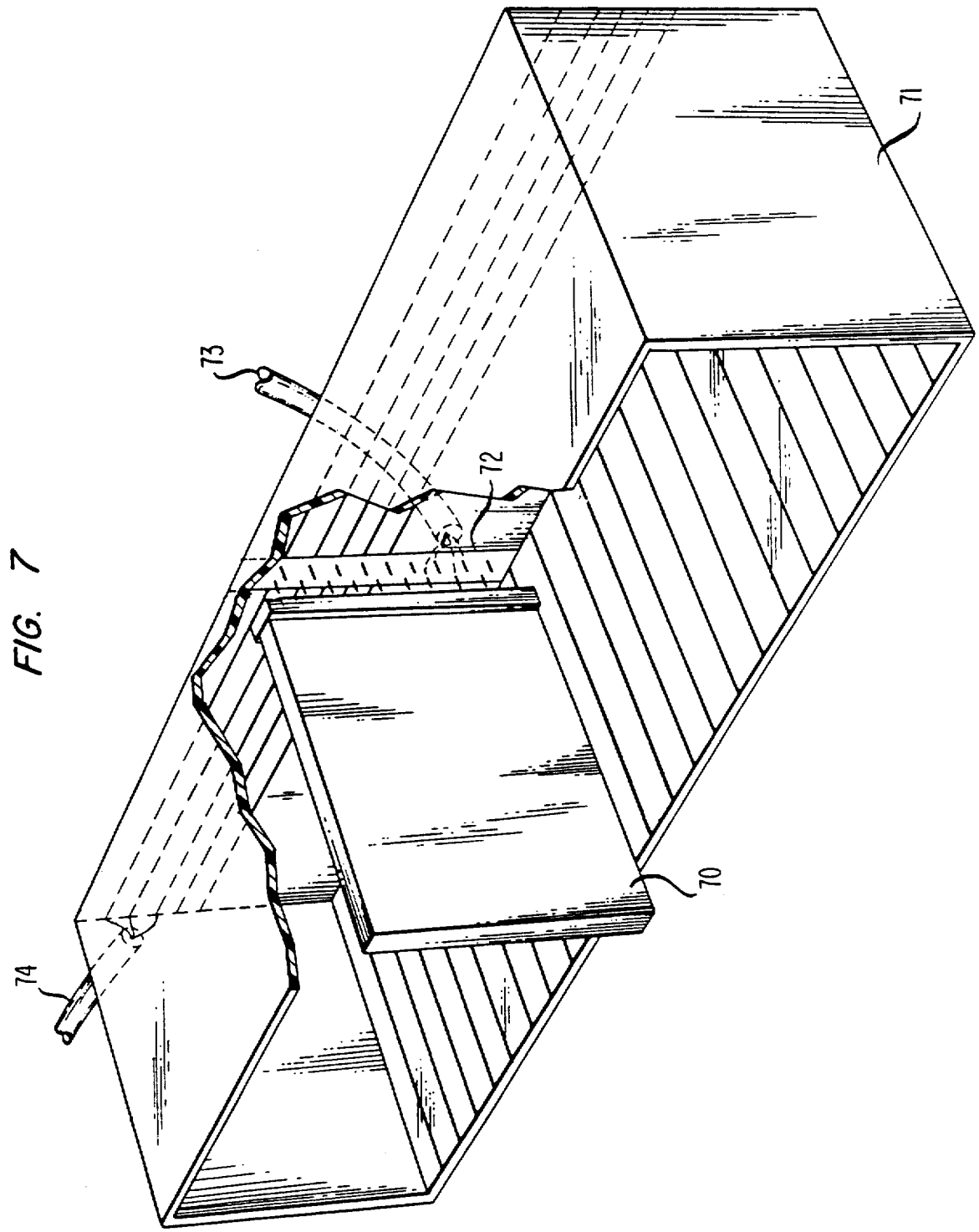
FIG. 7 shows a circuit board housing.

As shown in FIG. 7, circuit board 70 plugs into connector 72 of housing 71 and cables 73 and 74 interconnect other connectors 72 (not shown).

CONCLUSION

The foregoing discussion concerning the use of time division busses for certain types of information and packet-switched busses for other types of information is for illustration only. The particular traffic characteristics at any point in time will dictate which bus is the best one for a particular data transfer. The system described where both busses are connected to all board positions and available simply by plugging the board into the carrier allows the system architect great flexibility in design of the system, both in terms of initial contemplated usage and in terms of future evolutionary changes where different traffice characteristics can be expected.

In addition, the system processor could decide, on a transaction-by-transaction basis, which bus is at that time most appropriate, and tailor the system, on a dynamic basis, for optimum utilization of resources. This can only be achieved if all the boards have continuous access to both busses.

It should be understood that for the purpose of discussion herein, a packet-switched bus is a bus whose bandwidth is allocated on a demand basis, as opposed to a circuit-switched bus, whose bandwidth is allocated for the duration of the connection.

What is claimed is:

1. In a communication system, a time division bus arranged to interconnect a plurality of communication circuit boards for intercommunication among said circuit boards in established time slots on said time division bus, said time division bus characterized in that data communicated on said bus is routed by the time slot relationship of said data on said time division,
   a packet-switched bus arranged for intercommunication in bursty fashion among said plurality of communication circuit boards, said packet-switched bus characterized in that data communicated on said bus is routed in accordance with information contained within said data on said packet-switched bus,
   means for connecting certain of said circuits directly to said time division bus, certain of said circuits directly to said packet-switched bus, and certain of said circuits directly and concurrently to both of said busses, and wherein said communication circuits are contained within one or more circuit board housings, each circuit board housing having multiple positions therein for the placement of said communication circuit boards and wherein any of said communication circuit boards may be placed in any of said positions while still having said direct connection to either or both of said busses and wherein each of said busses includes a multipath cable having a termination for each said path at each said position of each said housing, and wherein said circuits which are connectable to both of said busses include means for receiving first data from one of said busses and for delivering second data to the other one of said busses in response to receipt of said first data.

2. In a communication system, a time division bus arranged to interconnect a plurality of communication circuits for intercommunication among said circuits in established time slots on said time division bus, said time division bus is characterized in that the bandwidth of said bus is allocated for the duration of any connection,
   a packet-switched bus arranged for intercommunication in bursty fashion among said plurality of communication circuits, said packet-switched bus is characterized in that the bandwidth of said bus is allocated on a demand basis only, and
   means for connecting certain of said circuits directly to said time division bus, certain of said circuits directly to said packet-switched bus, and certain of said circuits directly and concurrently to both of said busses, and wherein some of said circuits interface with communication equipment and wherein some of said circuits interface with common resource circuits,
   means for communicating information between said communication equipment interface circuits and said common resource circuits over said time division bus, and
   wherein at least one of said common resource circuits includes means for modifying said information, and
   means for communicating said modified information between said common resource circuits over said packet-switched bus.

3. A communication system comprising
   a plurality of interface circuits adapted for interfacing between said system and communication equipment for the transfer of information therebetween, each said interface circuit connectable to a communication bus in a specialized fashion,
   a plurality of shared resource circuits available for connection to any of said interface circuits,
   a first bus having time slots established thereon, said time slots assignable for the transfer of information between any of said interface circuits and other interface circuits and for the transfer of information between any of said interface circuits and said resource circuits, said time division bus characterized in that data communicated on said bus is routed by the time slot relationship of said data on said time division bus, and
   a second bus having packet-switched capability for the transfer of first information between any one resource circuit and a selected other resource circuit over said second bus while second information dependent upon said first information is concurrently being transferred between said one of said resource circuits and an interface circuit over said first bus, said packet-switched bus characterized in that data communicated on said bus is routed in accordance with information contained within said data on said packet-switched bus.

4. The invention set forth in claim 3 wherein said interface circuits are contained within housings each housing having multiple prewired positions therein for the semipermanent placement of said interface circuits and wherein any of said interface circuits may be placed in any of said positions while still having access to either or both of said busses without changing said prewiring between said positions.

5. A communication system comprising
   a circuit board housing having a plurality of positions for the insertion of circuit boards, each position having a number of individual paths,
   a plurality of interface circuits adapted for interfacing between said system and communication equipment for the transfer of information therebetween, said interface circuits contained on certain of said circuit boards and insertable into said housing at any of said positions thereof, a plurality of shared resource circuits contained on others of said circuit boards and insertable into said housing at any of said positions thereof, a first bus interconnecting like paths of each of said positions, said bus having time slots established thereon, said time slots assignable for the transfer of information between any of said housing positions having interface circuits inserted threat and other housing positions having interface circuits inserted threat and for the transfer of information between any of said housing positions having interface circuits inserted threat and housing positions having resource circuits inserted threat, said time division bus characterized in that data communicated on said bus is routed by the time slot relationship of said data on said time division bus, a second bus interconnecting like paths of each of said positions, said bus having packet-switched capability for the transfer of information between interface circuit at selected housing positions while information is concurrently being transferred to or from said selected housing positions over said first bus, said packet-switched bus characterized in that data communicated on said bus is routed in accordance with information contained within said data on said packet-switched bus, and wherein said information transferred over said first bus between a first resource circuit and an interface circuit includes speech signals, and wherein said first resource circuit includes means for modifying speech signals transferred thereto over said first bus and for placing said modified speech signals on said second bus.

6. The invention set forth in claim 5 wherein at least one of said resource circuits includes means for packaging information transferred from an interface circuit over said first bus for presentation over said second bus to a processor in packet form.

7. In a communication system, a time division bus arranged to interconnect a plurality of communication circuits for intercommunication among said circuits in established time slots on said time division bus, said time division bus characterized in that data communicated on said bus is routed by the time slot relationship of said data on said time division bus, a packet-switched bus arranged for intercommunication in bursty fashion among said plurality of communication circuits, said packet-switched bus characterized in that data communicated on said bus is routed in accordance with information contained within said data on said packet-switched bus, means for allowing each said circuit direct access concurrently to both of said busses, and wherein some of said circuits interface with communication equipment and wherein some of said circuits interface with common resource means, means for communicating information between said communication equipment interface circuits and said common resource circuits over said time division bus, means for communicating information between said selected common resource circuits over said packet-switched bus concurrently with the communication of information between said selected common resource circuits and a communication equipment interface circuit, and at least one of said resource circuits comprising means for receiving data from one of said busses and in response thereto placing data on the other of said busses.

8. In a communication system, a first bus arranged to interconnect a plurality of communication circuits for intercommunication among said circuits in a first manner where data is delivered in accordance with its time relationship with other data on said bus, a second bus arranged to interconnect a plurality of communication circuit boards in a second manner where data is delivered in accordance with address data associated with said delivered data, means for connecting certain of said circuits directly to said first bus, certain of said circuits directly to said second bus, and certain of said circuits directly and concurrently to both of said busses, and wherein said circuits which are connectable to both of said busses include means for receiving first data from one of said busses and for delivering second data to the other one of said busses in response to receipt of said first data.

* * * * *

UNITED STATES PATENT AND TRADEMARK OFFICE
CERTIFICATE OF CORRECTION

PATENT NO. : 4,535,448
DATED : August 13, 1985
INVENTOR(S) : Leslie A. Baxter and Sanford S. Brown It is certified that error appears in the above-identified patent and that said Letters Patent is hereby corrected as shown below:

In the drawings, FIG. 7 should appear as shown on the attached sheet.

Signed and Sealed this

Twenty-third Day of October, 1990

Attest:

HARRY F. MANBECK, JR.

Attesting Officer      Commissioner of Patents and Trademarks